United States Patent [19]
VanderWerf

[11] Patent Number: 5,918,427
[45] Date of Patent: Jul. 6, 1999

[54] TERMITE SHIELD FOR PERMEABLE SHEATHING

[76] Inventor: Pieter A. VanderWerf, 95 Tamarack Dr., Stoughton, Mass. 02072

[21] Appl. No.: 08/943,896

[22] Filed: Oct. 3, 1997

Related U.S. Application Data

[60] Provisional application No. 60/028,241, Oct. 4, 1996.

[51] Int. Cl.$^6$ .................................................. A01M 1/24
[52] U.S. Cl. ................................. 52/100; 52/97; 52/98; 52/101; 52/426; 52/586.2; 52/517; 52/302.6
[58] Field of Search ............................. 52/101, 100, 97, 52/62, 699, 582.1, 426, 169.11, 98, 586.1, 586.2, 517, 302.6, 302.1

[56] References Cited

U.S. PATENT DOCUMENTS

| | | |
|---|---|---|
| 1,716,023 | 6/1929 | Baum . |
| 2,092,659 | 9/1937 | Stone . |
| 2,126,664 | 8/1938 | Reis . |
| 2,138,182 | 11/1938 | Lipthrott . |
| 2,196,140 | 4/1940 | Coffman . |
| 2,581,521 | 1/1952 | Davis . |
| 2,714,430 | 8/1955 | Peterson . |
| 3,156,331 | 11/1964 | Sklar . |
| 3,173,179 | 3/1965 | Edwards . |
| 3,319,384 | 5/1967 | Berg .......................................... 52/100 |
| 3,340,654 | 9/1967 | Maier, Jr. . |
| 3,512,318 | 5/1970 | Turner ...................................... 52/62 X |
| 3,592,493 | 7/1971 | Goose . |
| 3,784,043 | 1/1974 | Presnick . |
| 3,994,471 | 11/1976 | Turolla .................................. 52/100 X |
| 4,005,558 | 2/1977 | Barrison . |
| 4,012,153 | 3/1977 | Pidgeon et al. . |
| 4,144,690 | 3/1979 | Avery ....................................... 52/376 |
| 4,164,105 | 11/1992 | Herbst et al. . |
| 4,686,803 | 8/1987 | Couderc et al. . |
| 4,999,958 | 3/1991 | Harrison . |
| 5,097,641 | 3/1992 | Hand et al. . |
| 5,105,591 | 4/1992 | Leopold . |
| 5,205,102 | 4/1993 | Plummer . |
| 5,274,968 | 1/1994 | Pardo . |
| 5,375,383 | 12/1994 | Lin et al. . |
| 5,625,992 | 5/1997 | Strick et al. . |
| 5,692,356 | 12/1997 | Baxter ....................................... 52/426 |
| 5,706,624 | 1/1998 | Lipson .............................. 52/582.1 X |

*Primary Examiner*—Robert Canfield
*Attorney, Agent, or Firm*—Hamilton, Brook, Smith & Reynolds, P.C.

[57] ABSTRACT

A termite shield includes two parallel planes of barrier material separated by perpendicular connecting strips to hold the barriers a fixed distance apart until completion of the wall fixes their positions. The strips can then be removed or bent back to permit access to the gap between the planes for inspection and repair. Flanges above and below secure the shield to sheathing above and below, and flanges along the back attach to the wall beneath to perfect the barrier.

19 Claims, 9 Drawing Sheets

FIG. 11 ued
TERMITE SHIELD FOR PERMEABLE SHEATHING

RELATED APPLICATION

This application claims priority to U.S. provisional application Ser. No. 60/028,241, filed on Oct. 4, 1996, the entire teachings of which are incorporated herein by reference.

BACKGROUND

A growing number of buildings in North America have foundations or exterior walls of concrete sheathed with foam or another permeable material on the outside. To prevent the free passage of subterranean termites vertically up through the sheathing and into wood members of the building they often include a termite shield. In this application a termite shield is a strip of sheet metal placed through the foam along a continuous horizontal line around the entire perimeter of the building, either shortly above or shortly below grade. Termites tunneling up within the foam hit the shield, whereupon they must either quit their upward journey or exit the foam to go around the shield. Once outside the foam they can be detected and/or treated with pesticides.

SUMMARY OF THE INVENTION

The traditional termite shields have four significant shortcomnings. First, they require cutting the foam sheathing along a horizontal line, bending the sheet metal appropriately, inserting the sheet metal, and somehow attaching the shield to the foam below and above. These operations are awkward and time-consuming, and therefore add to job cost.

Second, once in place they are out of view. It is therefore impossible to confirm that they completely penetrate the foam and have no gaps, or to repair them if necessary, without tearing the sheathing apart.

Third, they introduce a metal penetration through the foam. The foam is usually intended to serve as thermal insulation and metal acts as a thermal bridge. Therefore the shield reduces the effective insulation of the wall.

Fourth, the shield acts as an impermeable moisture barrier. Moisture that finds its way into the foam layer of the wall can dam up on top of the barrier and eventually find its way inward through the wall.

Accordingly, there is a need for a termite shield that can be quickly and conveniently placed within the seams of the sheathing, that can be opened for inspection and repair after construction is complete, that can be economically fabricated from any of a wide range of materials, and that allows moisture to drain out of the foam even after construction is complete.

The present invention consists of a channel and various connecting pieces that form a shield that snaps into place onto the top of a sheet of foam sheathing or other permeable sheathing. The next sheet of sheathing above then slides into place in the shield. Rather than a single plane of material serving as the barrier to termites, the channel includes two parallel planes separated by open space, each plane serving as a barrier. The open space provides a gap through which one can visually verify the integrity of the shield after construction and, if necessary, can repair it. A separate, movable flap spanning the space between the two planes toward their exterior sides covers the gap when it is not under inspection. The open space behind the flap is also available to house insulation material. This flap in its closed position and an additional, removable strip of material connecting the interior sides of the planes hold the two barrier planes of the shield apart during construction. Two flanges, one extending upward from exterior side of the upper barrier and one extending upward from its interior side, grip the sheathing above for a secure connection. Two more extending downward from the lower barrier grip the sheathing below analogously. Weep holes in the upper barrier toward its exterior side permit moisture accumulated in the sheathing above to drain to the exterior. A drip edge along the underside of the upper barrier on the exterior side prevents exterior water from trickling into the gap. Ridged surfaces running along the channel also provide a place for pest control operators to deposit pesticides to kill termites attempting to traverse the break in the foam created by the invention. The shape of the invention lends itself to manufacture by extrusion or fabrication techniques using any of a wide range of rigid materials.

In preferred embodiments, the flanges extend upward from the upper the barrier plane and downward from the lower barrier plane. In addition to fitting the channel precisely and securely to the sheets of foam, these flanges further inhibit entry or exit by termites. Termites must expose themselves not only as they traverse the gap, but as they scale the height of each of these flanges. The weep holes are too small to allow passage by termites. The flap is initially connected to both barrier planes to help maintain the distance between them. But it is designed to permit tearing it away from the lower plane when installation is complete. It then pivots or bends near the joint with the upper plane to allow for inspection and repairs.

In preferred embodiments, connected to the interior side of each barrier plane and lying in the same plane is an additional flange that attaches to the wall without gaps of sufficient size to allow the passage of termites. These flanges might attach by being cast into the concrete or by being adhered with a suitable adhesive.

In one preferred embodiment, the inside surface of the drip edge includes a horizontal ridge to hold pesticides sprayed in by pest control operators. Connections between separate lengths of the shield are made by means of U-shaped link pieces that snap into place across the seam created by two abutted sections of the main shield channel. These links cover any gap between the two abutted pieces.

A second preferred embodiment allows the easy fitting of the shield to corners in the wall. Each length of channel is mitre-cut at each end. Some ends are cut with the mitre along a 45-degree angle, and the others along a 135-degree angle. These ends abut at comers and at joints along the straight length of the wall. As necessary, the installer can also cut the shield to length so that adjacent pieces abut correctly. All adjacent pieces can be glued along the seam or connected with links to eliminate any gaps.

A third preferred embodiment includes special tie pieces that connect to the interior edge of the invention channel so that two separate shields are held an even distance from one another. This enables the shields to rest on two separate, parallel sheets of sheathing, which is appropriate for construction systems that begin with parallel shells of foam, the cavity between which is later filled with concrete. The ties can be cut to multiple lengths to span a wide range of distances between the layers of foam.

A fourth preferred embodiment includes a conduit within the lower section of the invention channel that runs continuously along its length. The conduit is suitable for containing pesticide injected into it by a pest control operator, and includes small holes through which that pesticide migrates into the foam below. It includes links that fit into the channel and contain their own conduit through which to allow the passage of the pesticide.

The invention includes pre-mitred corner pieces that can be used to continue the shield around a corner in the building. The premitred corner consists of two lengths of the channel cut at 45-degree angles and joined to form a right angle. A corner thus formed of the channel of the first embodiment forms appropriate corners for a shield made of that channel. A corner formed of the channel of the third embodiment would be appropriate for a shield constructed of that channel, that is, a shield of two parallel perimeters of the channel connected with ties. A corner formed of the channel of the fourth embodiment would contain a conduit that turns the corner, and thus would be appropriate for the pesticide-carrying embodiment of the shield for which the channel is designed. In addition, the corner constructed with channel of the fourth embodiment would is outfitted with an access hole through which a pest control operator can inject pesticide into the conduit.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
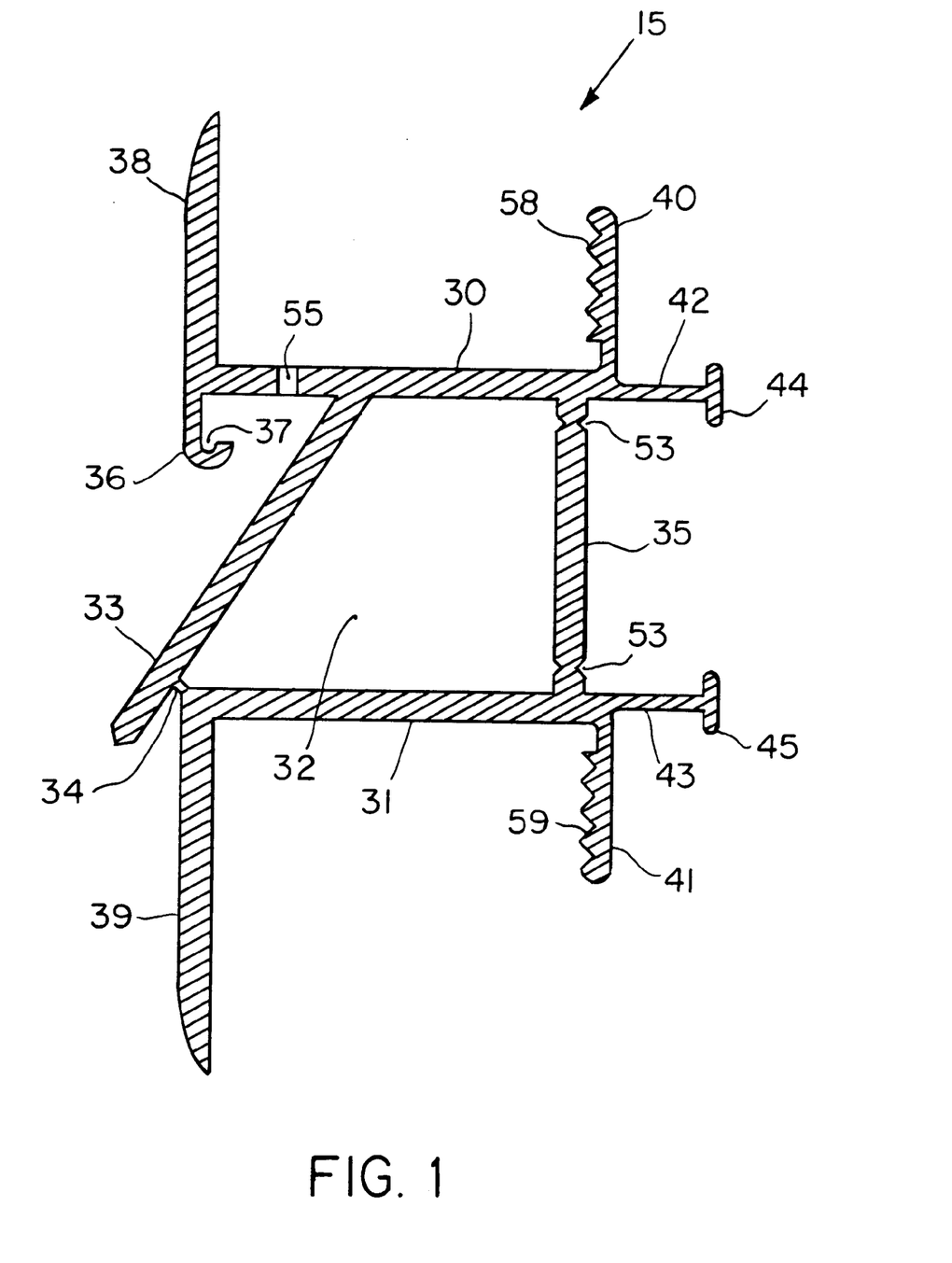
FIG. 1 is a sectional view of the present invention channel before installation.
Figures 3, 4, 5:
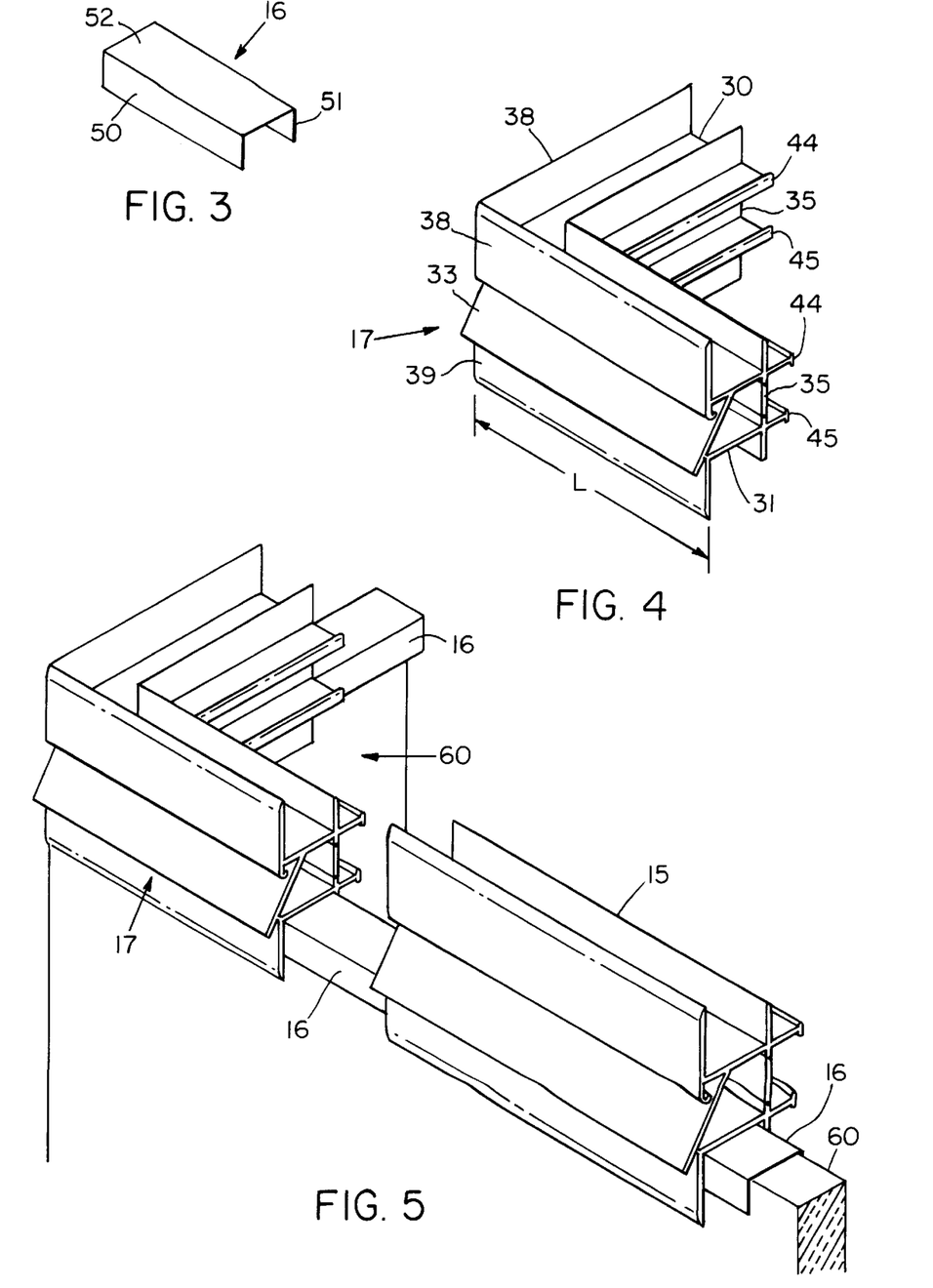
FIG. 3 is a perspective view of a link piece.
FIG. 4 is a perspective view of a pre-mitred corner section of the channel.
FIG. 5 is a perspective view of the pieces of the invention being assembled into a complete shield on foam sheathing.

Referring to FIGS. 1, 3, and 4, channel 15, link 16, and premitred corner 17 are assembled into a complete termite shield (FIG. 5). Channel 15 has an upper barrier plane 30 and, parallel to this, a lower barier plane 31, joined near their exterior sides by a movable flap 33, sloping downward toward the exterior, and near their interior sides by a removable strip 35, perpendicular to the barrier planes. The flap/barrier connection point 34 and the strip/barrier connection points 53 consist of a line of material that is thinner than the adjacent walls, and therefore can be readily severed by tearing or cutting. The open area encompassed by the barriers 30 and 31, flap 33, and strip 35 is an inspection/repair gap 32.

Connected and perpendicular to the upper barrier 30 along its exterior side is an upper exterior flange 38, and connected and perpendicular to upper barrier 30 along its interior side is upper interior flange 40, which serve to position the shield correctly on the sheathing and grip the channel to the sheathing. The upper exterior flange 38 also serves as an additional barrier to termites, lengthening the distance they must be exposed in any attempt to emerge from the foam below and then re-enter the foam above. Lining the interior surface of upper interior flange 40 are upper horizontal gripping ridges 58 that help hold the channel 15 to the sheathing. Connected to the lower barrier 31 are a lower exterior flange 39 and a lower interior flange 41, the latter with lower horizontal gripping ridges 59, which are positioned analogously to 38, 40, and 58, and which serve analogous purposes.

Also connected to the upper barrier 30 along the exterior side and lying in the same plane as and extending downward from upper exterior flange 38 is a drip edge 36 with a pesticide cavity 37 on its interior face. The drip edge 36 prevents moisture accumulating on the exterior face of the building from traveling onto the bottom of the upper barrier 30 or into the gap 32. The pesticide cavity 37 is a horizontal ridge along the inside of the drip edge 36 that provides a reservoir into which pest control operators can place pesticide for the elimination of pests that might attempt to traverse the termite shield along its exterior.

Vertical weep holes 55 of $\frac{1}{32}$" diameter through the upper barrier plane 30 are located to the exterior of the intersection of upper barrier 30 and flap 33 to provide passage for moisture accumulated in the foam above so that it drains to the exterior.

Connected to the interior side of upper barrier plane 30 and lying in the same plane is a wall of material that forms an upper anchor flange 42, with an upper anchor ridge 44 at the end of, and perpendicular to, the upper anchor flange 42. The flange 42 and ridge 44 are cast into the concrete as it is poured, or adhered to it afterward, to create a connection between shield and concrete wall that holds the shield firmly in place and is impenetrable to pests. The lower anchor flange 43 and lower anchor ridge 45 serve the same purposes down below.

The link 16 (FIG. 3) consists of an exterior flange 50, barrier plane 52, and interior flange 51. The outside dimensions of the link 16 are sized so that the link will snap into place within the confines described by upper exterior flange 38, upper barrier plane 30, and upper interior flange 40, such that walls 50 and 38, 52 and 30, and 51 and 40, are in contact with one another. The link will also snap into the analogous position in the space described by walls 39, 31, and 41 in the lower portion of channel 15. In this way it serves as a bridge across the seams formed when adjacent lengths of channel 16, or a length of channel 16 and a premitred corner 17, are abutted (FIG. 5).

Referring to FIG. 4, a premitered comer 17 consists of two sections of channel 15 approximately 8" long at the longest point L that are cut at 45-degree angles at one end and attached at the angled ends to form a 90-degree angle of the channel.

Referring to FIG. 5, the complete termite shield is formed by placing one link on the sheathing below centered over each anticipated joint between two lengths of channel or between a length of channel and a premitred corner, then placing one premitred corner on top of the sheathing below at each corner in the wall, and snapping successive lengths of channel onto the foam below from corner to corner to form a complete, uninterrupted shield around the perimeter of the building.

Figure 2:
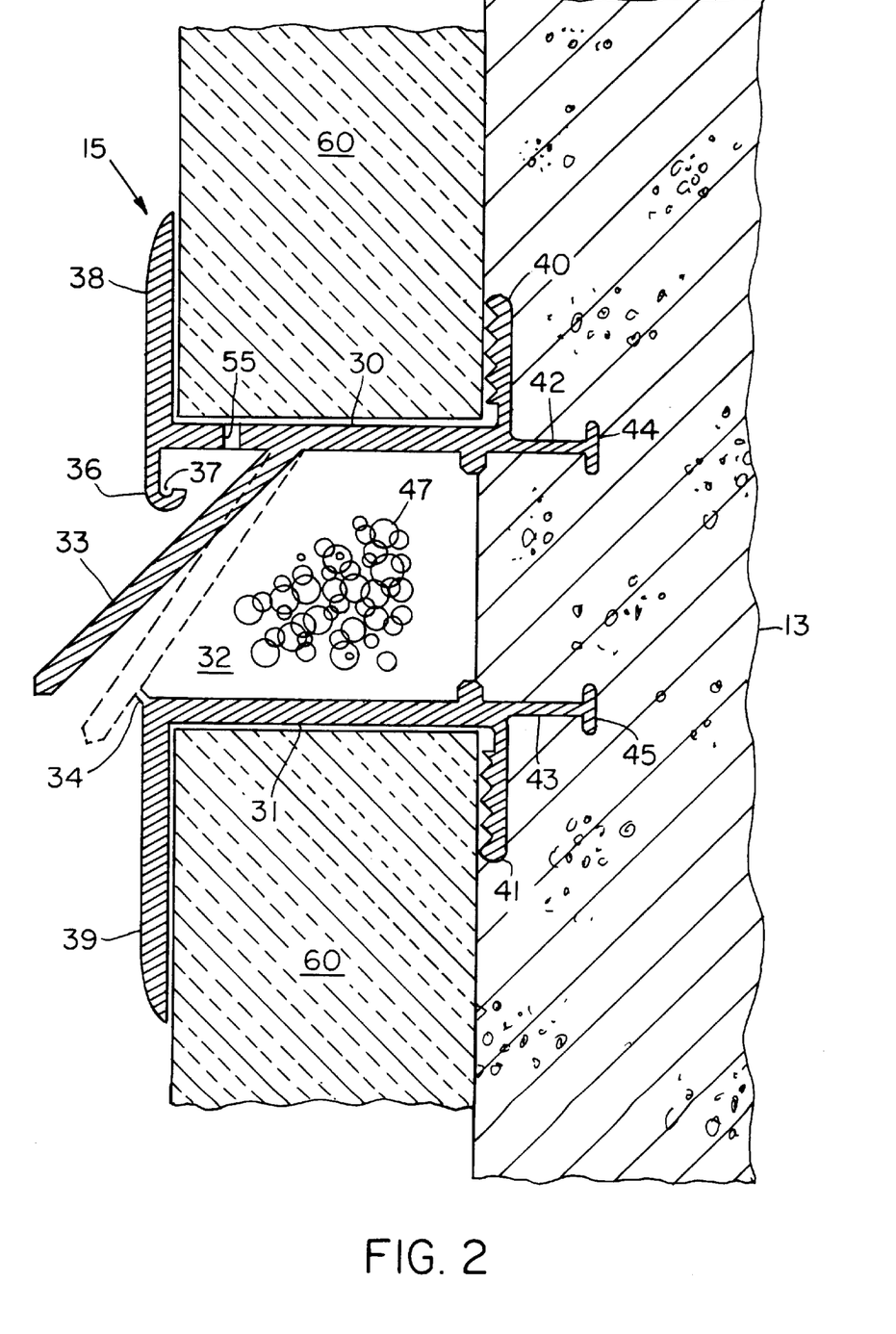
FIG. 2 is a sectional view of the present invention channel after installation and removal of the removable strip and insertion of optional insulation.

Referring to FIG. 2, installation is complete when concrete 13 is cast, the flap/barrier connection 34 is broken so that the flap 33 can be lifted, the removable strip has been removed, and optional insulation 47 (if any) is placed into the inspection/repair gap 32.

Figure 6A:
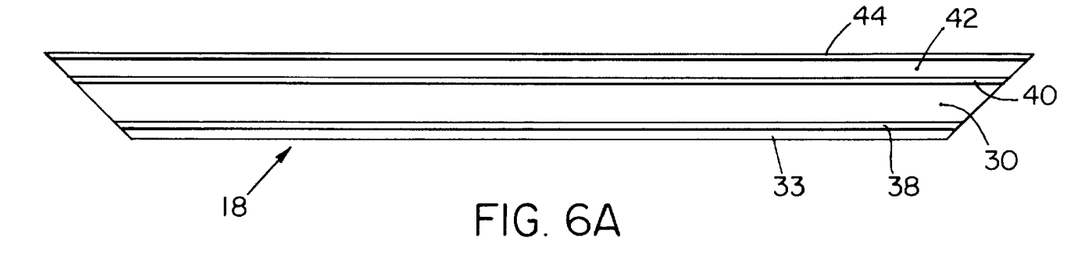
FIGS. 6A and 6B are plan views of channels with mitred ends, which comprise another preferred embodiment of the invention.
Figures 6B, 7:
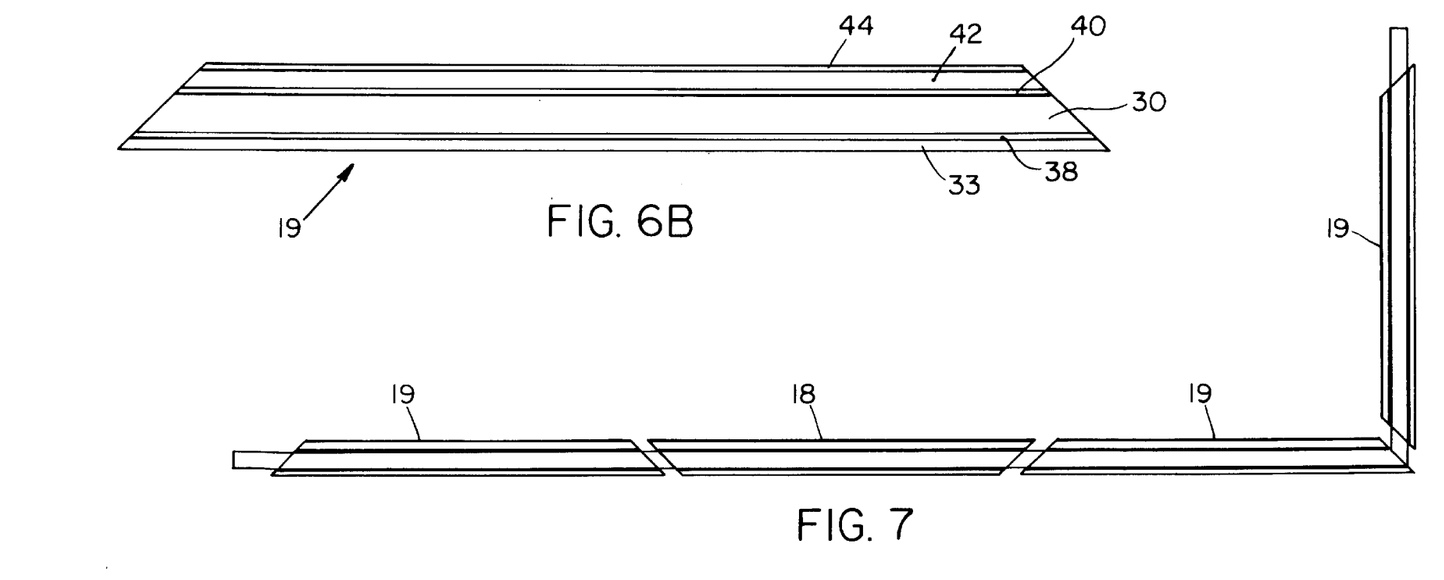
FIG. 7 is a plan view of channel with mitred ends being assembled into a complete shield on foam sheathing.

FIGS. 6A and 6B depict another preferred embodiment of the invention that includes no dedicated corner pieces. In this embodiment the lengths of channel are pre-cut with 45-degree or 135-degree mitres at each end. Some lengths are cut into a right-handed length 18 (FIG. 6A), of which the lines described by interior flange 40, exterior flange 38, and the lines of the cuts at each end form a trapezoid with the shorter of the parallel sides along the exterior of the channel. Others are cut into a left-handed length 19 (FIG. 6B), which describes a trapezoid with the shorter of the parallel sides along the interior.

FIG. 7 depicts the assembly of these lengths into a continuous shield by placing right-handed and left-handed lengths around the perimeter over the sheathing in alternating fashion along the length of a wall, and by placing two right-handed lengths at an outside corner and two left-handed pieces at an inside corner. Abutted seams between lengths can then be sealed by a link piece or such means as adhesives.

Figure 8A:
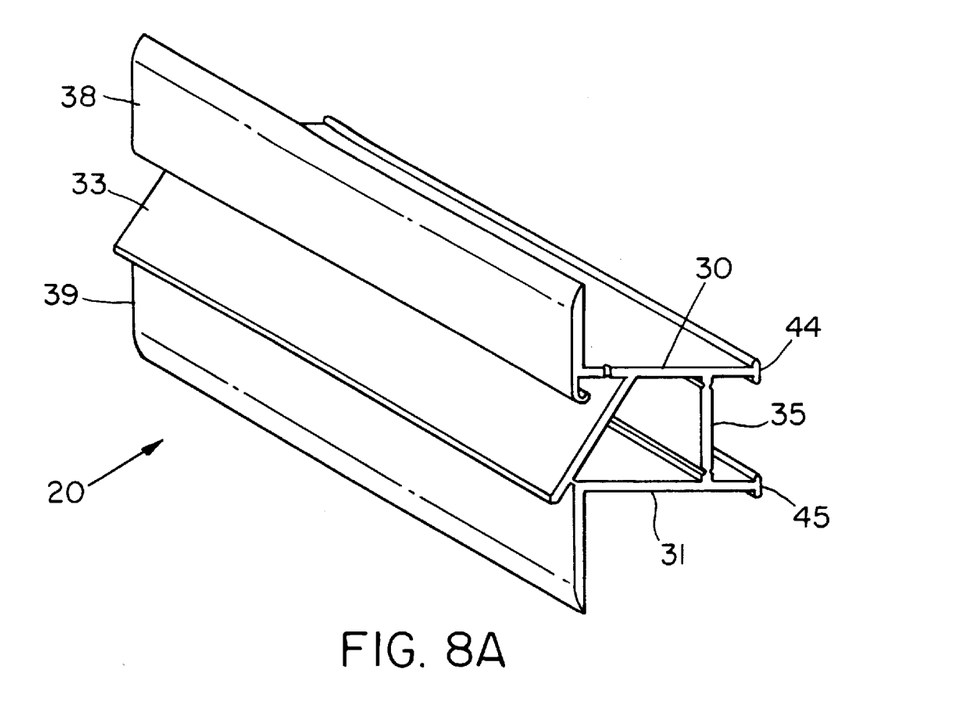
FIG. 8A is a perspective view of the channel for another preferred embodiment of the invention.
Figure 8B:
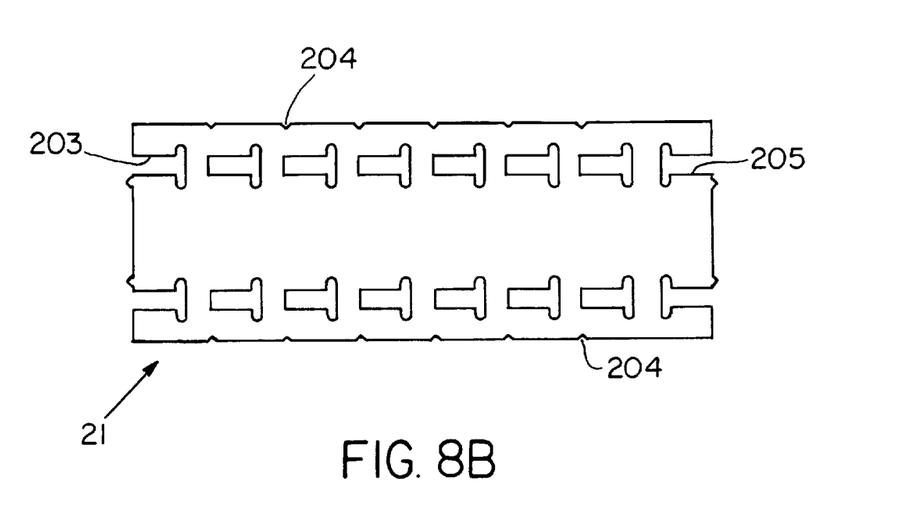
FIG. 8B is an end view of a tie for use with the channel of FIG. 8A.
Figure 9:
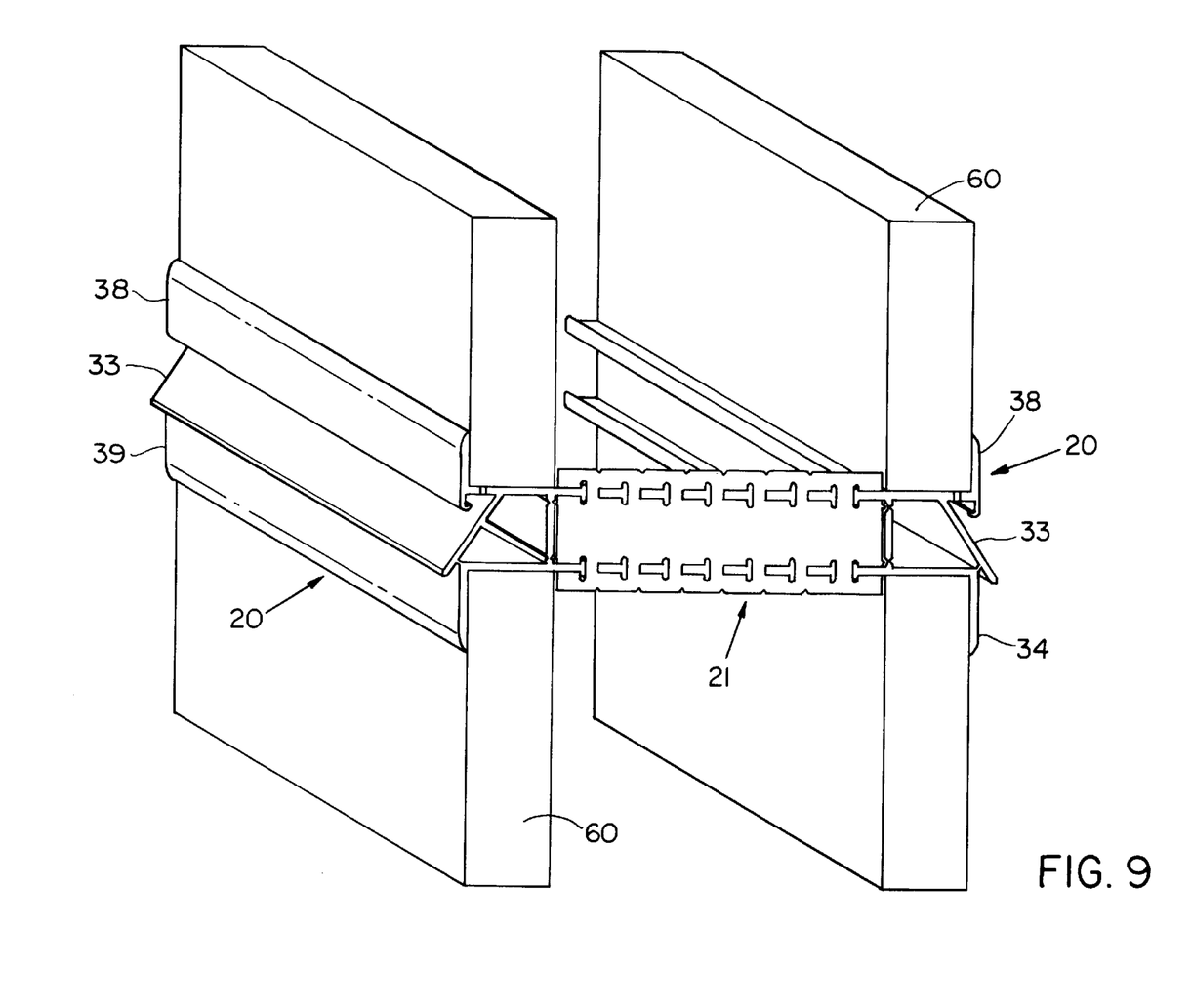
FIG. 9 is a perspective view of the channel and ties after installation but before removal of the removable strip or insertion of optional insulation.
Figures 10A, 10B:
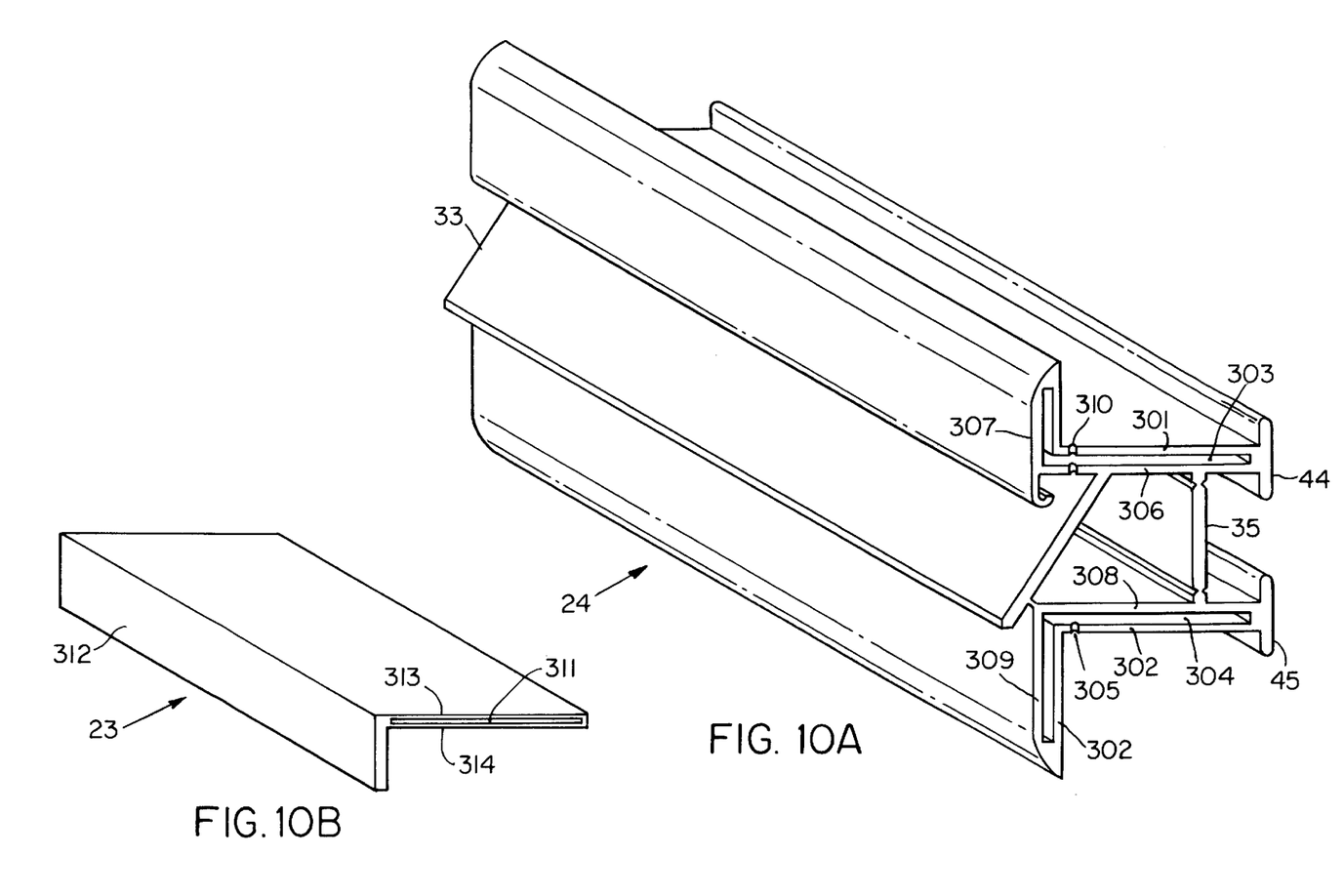
FIG. 10A is a perspective view of a channel of another preferred embodiment of the invention, which includes conduits for pesticide.
FIG. 10B is a perspective view of a link piece for the channel of FIG. 10A.
Figure 10C:
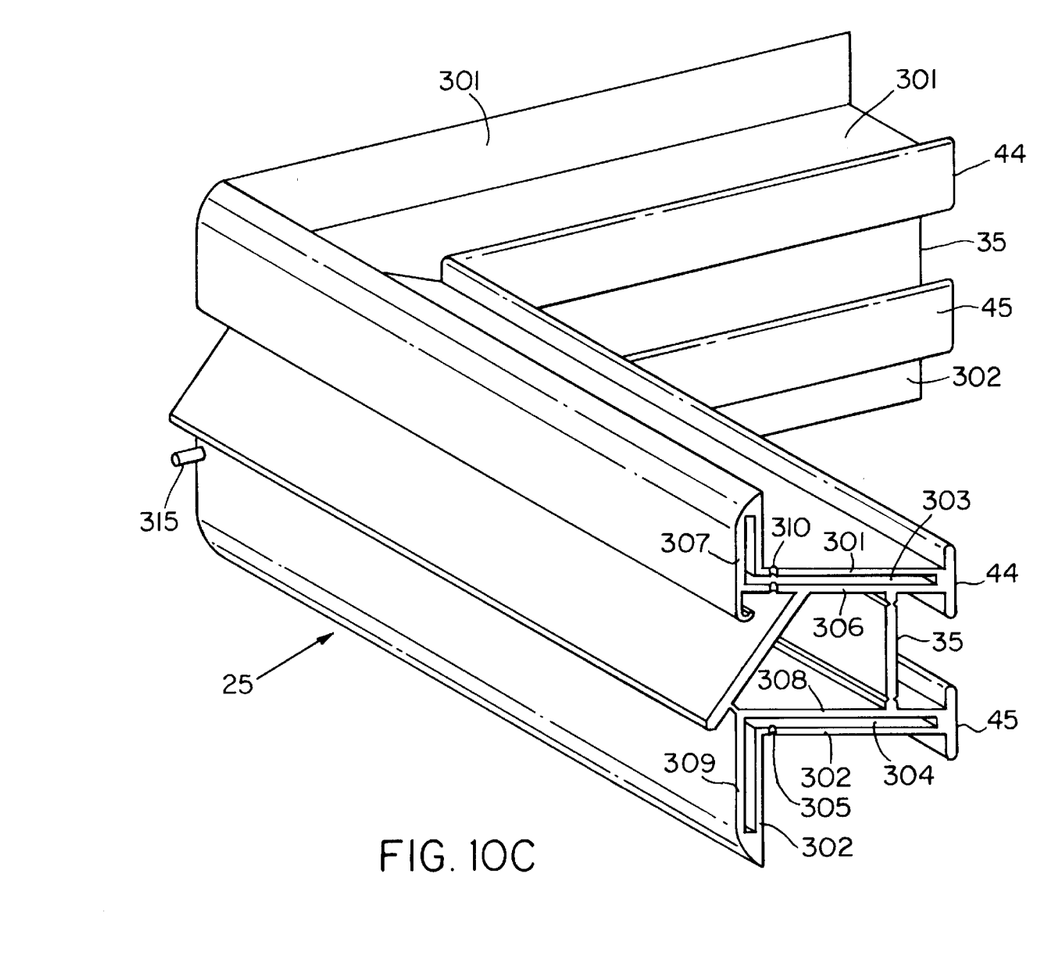
FIG. 10C is a perspective view of a premitred corner piece for use with the channel of FIG. 10A.

FIGS. 8A and 8B depict another preferred embodiment that is suitable for concrete wall systems utilizing two layers of foam, one on the exterior and one on the interior face of the concrete. A channel 20 (FIG. 8A) has no interior flanges. Instead, an adjustable tie 21 (FIG. 8B) snaps onto the upper anchor ridge 44 and lower anchor ridge 45 of the channel. As depicted in FIG. 9, when two channels 20 are placed back-to-back on the two parallel layers of foam 60, ties 21 are snapped onto the ridges of each channel to hold them a constant distance apart.

The tie 21 can be cut at several points to change its length to make it appropriate for walls of different thicknesses. Fixed locking teeth 205 at one end snap onto the ridges of either channel. At the opposite end of the tie are several sets of alternative locking teeth 203 along the length of the tie. By cutting the end of the tie off along the straight line between two cut marks 204 the installer can adjust the length of the tie to correspond to the intended width of the wall.

Another preferred embodiment, depicted in FIGS. 10A, 10B, 10C, and 11, incorporates conduits along the length of the shield to carry pesticide around the perimeter of the building and deposit it onto the sheathing to provide an added deterrent to pests. A channel 24 (FIG. 10A) has a lower barrier 308 and lower flange 309, inside of which runs a lower interior wall 302. These three walls create within them a hollow, lower conduit 304, that has small holes 305 to release pesticide from within the conduit 304 onto sheathing below. An analogous upper interior wall 301 and upper conduit 303 behind the upper barrier 306 and upper flange 307 are not intended to carry pesticide. However, weep holes 310 in both the upper barrier 306 and upper interior wall 301 permit accumulated moisture to drain from the sheathing above the shield to the outside.

Figure 11:
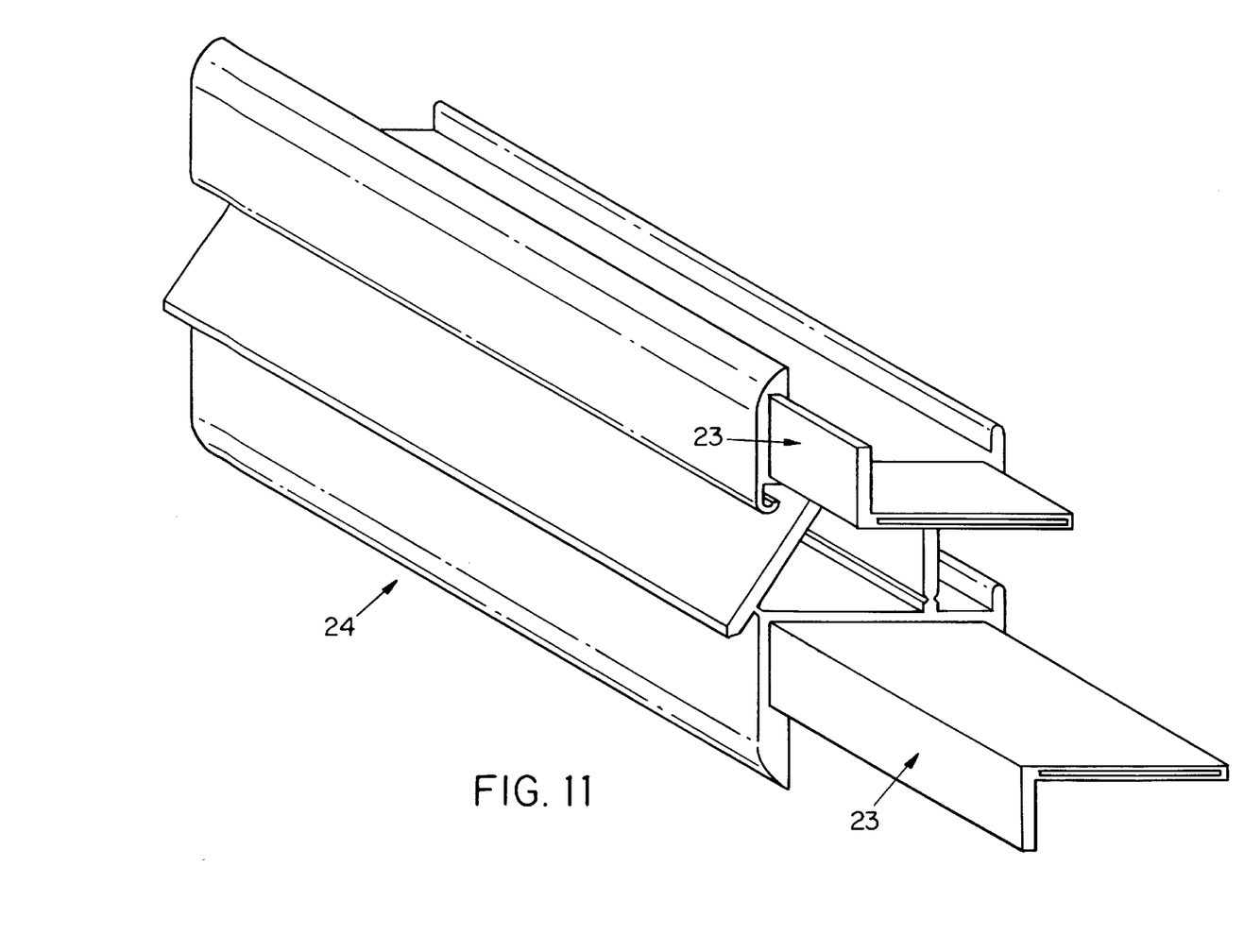
FIG. 11 is a perspective view of channel and links with conduits being assembled into a complete shield.

As depicted in FIG. 11, a link 23 (FIG. 10B) fits snugly into the lower conduit 304 and upper conduit 303 at the end of a length of channel to connect two abutted lengths at their ends. Each link consists of an exterior flange 312 and, perpendicular to 312, a barrier plane 313, and below and parallel to the barrier plane 313 an interior wall 314. The exterior dimensions of the link 312 correspond to the dimensions of cavity 304 or 303 such that link 313 fits snugly into cavity 304 or 303, as depicted in FIG. 11. The link conduit 311 that is the open space between barrier plane 313 and interior wall 314 runs the length of the link to allow pesticide to flow from the lower conduit 304 of a length of channel into the lower conduit of the adjacent length. Premitred corner 25 (FIG. 10C) fits over the foam sheathing at corners in the wall. It attaches to adjacent lengths of channel also with the link 23 in a fashion analogous to the attachment of two adjacent lengths of channel. Premitred corner 25 is outfitted with a tubular opening 310 running from within the lower conduit 304 to beyond the exterior of the shield. Through this opening 310 pesticide is injected into the lower conduit 304.

Although specific dimensions have been given for weep holes 55 and the length L of premitred corner 17, those dimensions are merely examples and can be varied accordingly to accommodate different applications. The materials for all parts can be made from any suitable materials such as any plastic, aluminum, copper, steel, galvanized steel, or stainless steel. Although the completed invention can fit over foam sheathing on a concrete wall, it can be varied to fit over sheathing of any material requiring protection from insect tunneling or requiring moisture drainage such as fiberglass batting or boards, aerated or cellular concrete, or composites of cement and foam or other soft materials; and it can be varied to fit over sheathing on a wall of any material such as steel, lumber, or panels sandwiching foam between layers of wood or gypsum sheathing.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, the anchor ridges might be glued to a concrete or masonry wall after its completion, rather than be cast into concrete as it is poured into place.

What is claimed is:

1. A termite shield adapted to form a complete break in soft or permeable wall sheathing, comprising an upper barrier plane and a lower barrier plane of insect impermeable material, each having interior and exterior sides, the planes being spaced apart by a strip on the interior side adapted to be torn or cut away after installation and a downwardly sloping flap on the exterior side, the flap having a bottom connected to the lower plane with a flap/barrier connection having thinner material than the flap, thereby enabling the flap to be cut or pulled away from the lower plane so that the flap can be lifted up to provide access to an open space between the planes for inspection, repair, or insertion of insulation.

2. The termite shield of claim 1 in which flanges extend upward from the upper plane and downward from the lower plane to position and hold the shield to the sheathing material.

3. The termite shield of claim 2 in which weep holes penetrate the upper plane for drainage of accumulated moisture in the sheathing above.

4. The termite shield of claim 3 in which a drip edge runs along the exterior side of the upper plane to prevent moisture on the sheathing from accumulating and migrating into the space between the planes.

5. The termite shield of claim 4 further comprising a horizontal ridge depending from the drip edge for holding pesticide to deter pests from traveling over the shield.

6. The termite shield of claim 5 in which anchor flanges with ridges extend from the interior side of each plane to connect the shield to a wall behind the sheathing.

7. The termite shield of claim 6 further comprising a U-shaped member that fits snugly within the flanges of one of the planes for adjoining two adjacent lengths of shield together.

8. The termite shield of claim 6 in which each length of the shield is precut at each end at 45- or 135-degree angles to permit snug abutting of the lengths at corners and along the length of a wall.

9. The termite shield of claim 6 in which a tie piece snaps onto the anchor ridges of the shield so that two parallel lengths of shield can be held in place on two layers of sheathing lying in parallel planes.

10. The termite shield of claim 9 in which the tie piece can be adjusted to various lengths to accomodate different spacings between the layers of sheathing.

11. The termite shield of claim 9 further comprising a conduit into which pesticide can be injected.

12. The termite shield of claim 11 in which the shield includes holes through which pesticide within the conduit can flow onto sheathing below.

13. The termite shield of claim 12 further comprising a link piece that fits snugly into the conduits for connecting adjacent lengths of shield.

14. The termite shield of claim 13 in which the link piece has a conduit running the length of the link for the free flow of pesticide between adjacent lengths of shield.

15. The termite shield of claim 1 in which the shield is a corner piece for forming a complete break in wall the sheathing at a 90-degree corner in the sheathing.

16. The termite shield of claim 15 in which the shield as designed to be connected with ties.

17. The termite shield of claim 15 further comprising a 90-degree angle conduit for carrying pesticide.

18. The termite shield of claim 17 in which the shield includes an opening for injection of pesticide into the conduit.

19. A termite shield adapted to form a complete break in soft or permeable wall sheathing, comprising an upper barrier plane and a lower barrier plane of insect-impermeable material, each having interior and exterior sides, weep holes penetrating the upper plane for drainage of accumulated moisture in the sheathing above, the planes being spaced apart by a strip on the interior side adapted to be torn or cut away after installation and a flap on the exterior side, the flap having a bottom adapted, to be cut or pulled away from the lower plane so that the flap can be lifted up to provide access to an open space between the planes for inspection, repair or insertion of insulation, flanges extending upward from the upper plane and downward from the lower plane to position and hold the shield to the sheathing.

* * * * *